US010258926B2

(12) United States Patent
Thiel et al.

(10) Patent No.: US 10,258,926 B2
(45) Date of Patent: Apr. 16, 2019

(54) HYBRIDIZATION OF HUMIDIFICATION-DEHUMIDIFICATION AND PRESSURE-RETARDED OSMOSIS

(71) Applicant: Massachusetts Institute of Technology, Cambridge, MA (US)

(72) Inventors: Gregory Parker Thiel, Cambridge, MA (US); Leonardo David Banchik, Somerville, MA (US); John H. Lienhard, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 181 days.

(21) Appl. No.: 15/040,066

(22) Filed: Feb. 10, 2016

(65) Prior Publication Data

US 2016/0229714 A1    Aug. 11, 2016

Related U.S. Application Data

(60) Provisional application No. 62/114,821, filed on Feb. 11, 2015.

(51) Int. Cl.
*B01D 15/00* (2006.01)
*C02F 1/44* (2006.01)
(Continued)

(52) U.S. Cl.
CPC ........... *B01D 61/025* (2013.01); *B01D 3/346* (2013.01); *B01D 5/006* (2013.01); *C02F 1/048* (2013.01);
(Continued)

(58) Field of Classification Search
USPC .......................... 60/649, 673; 137/2; 203/11
See application file for complete search history.

(56) References Cited

U.S. PATENT DOCUMENTS 3,906,250 A    9/1975 Loeb
4,832,115 A    5/1989 Albers et al.
(Continued)

OTHER PUBLICATIONS

US Patent and Trademark Office, International Search Report and Written Opinion for PCT/US16/17262 (related PCT application) (dated Jul. 1, 2016).
(Continued)

*Primary Examiner* — Hayden Brewster
(74) *Attorney, Agent, or Firm* — Modern Times Legal; Robert J. Sayre

(57) ABSTRACT

A carrier gas and a combined feed liquid are directed through a humidifier, where water vaporizes from the combined feed liquid into the carrier gas, and through a dehumidifier, where the combined feed liquid cools the carrier gas to condense water from the carrier gas. At least a portion of the concentrated brine stream from the humidifier is directed through a pressure-retarded osmosis unit, while an initial feed solution is directed, in counter-flow, through the osmosis unit. Water from the initial feed solution flows through a membrane in the osmosis chamber into the concentrated brine stream to dilute and increase the volumetric flow rate of the brine stream. The diluted brine stream is extracted from the osmosis chamber and depressurized to produce power, while the concentrated initial feed solution is combined with the depressurized, diluted brine stream to form the combined feed liquid.

9 Claims, 2 Drawing Sheets

(51) Int. Cl.
  *B01D 61/02* (2006.01)
  *C02F 1/04* (2006.01)
  *B01D 3/34* (2006.01)
  *B01D 5/00* (2006.01)
  *F17D 1/00* (2006.01)
  *F03G 7/00* (2006.01)
  *C02F 103/08* (2006.01)
  *C02F 1/16* (2006.01)

(52) U.S. Cl.
  CPC .......... *C02F 1/44* (2013.01); *B01D 2313/22* (2013.01); *C02F 1/16* (2013.01); *C02F 2103/08* (2013.01); *Y02A 20/131* (2018.01)

(56) References Cited

U.S. PATENT DOCUMENTS

| | | | |
|---|---|---|---|
| 5,123,481 | A | 6/1992 | Albers et al. |
| 8,197,693 | B2 | 6/2012 | Al-Jlil |
| 8,252,092 | B2 | 8/2012 | Govindan et al. |
| 8,292,272 | B2 | 10/2012 | Elsharqawy et al. |
| 8,647,477 | B2 | 2/2014 | Govindan et al. |
| 8,695,343 | B2 | 4/2014 | Moe |
| 2011/0056822 | A1 | 3/2011 | Elsharqawy et al. |
| 2011/0233137 | A1* | 9/2011 | Cath .............. B01D 61/002 210/644 |
| 2012/0091061 | A1* | 4/2012 | Al-Jlil .............. B01D 61/002 210/640 |
| 2013/0199921 | A1* | 8/2013 | McGovern .......... B01D 1/16 203/10 |

OTHER PUBLICATIONS

L. D. Banchik and J. H. Lienhard V, "Thermodynamic analysis of a reverse osmosis desalination system using forward osmosis for energy recovery," ASME 2012 International Mechanical Engineering Congress and Exposition, American Society of Mechanical Engineers, (2012).

W. Akram, M. H. Sharqawy, and J. H. Lienhard V, "Energy utilization of brine from an MSF desalination plant by pressure retarded osmosis," The International Desalination Association World Congress on Desalination and Water Reuse 2013, Tianjin, China (2013).

G.P. Thiel, et al., "Hybridization of humidification-dehumidification and pressure retarded osmosis for brine concentration applications," IDA World Congress on Desalination and Water Reuse, San Diego (Aug. 2015).

* cited by examiner

HYBRIDIZATION OF HUMIDIFICATION-DEHUMIDIFICATION AND PRESSURE-RETARDED OSMOSIS

RELATED APPLICATION

This application claims the benefit of U.S. Provisional Application No. 62/114,821, filed 11 Feb. 2015, the entire content of which is incorporated herein by reference.

BACKGROUND

Humidification-dehumidification (HDH), which is shown schematically in FIG. 1, is a desalination process that uses air as a carrier gas to evaporate water from a saline feed stream. This HDH system 10 includes a humidifier 12 and a dehumidifier 14. In the humidifier 12, a warm liquid feed humidifies a cool, dry carrier-gas (e.g., air) stream in counterflow. The warm, moist carrier-gas stream exits the humidifier and is cooled and dehumidified in the dehumidifier 14, producing a pure water condensate. A liquid-feed conduit 16 circulates the liquid feed through the system, while a carrier-gas conduit 18 circulates the carrier-gas stream through the system.

The cooled carrier gas is either recirculated in a closed loop (closed-air cycle) via conduit 18 or exhausted to the surroundings (in an open-air cycle). HDH can be particularly advantageous (e.g., in comparison with reverse osmosis) for small-scale applications, for high-salinity feeds, and where the feed liquid presents a high scaling potential. HDH systems are further described in U.S. Pat. No. 8,292,272 B2; U.S. Pat. No. 8,252,092 B2; and U.S. Pat. No. 8,647,477 B2.

In pressure-retarded osmosis (PRO), a concentrated (higher-salinity) draw stream and a lower-salinity feed stream are separated by a semi-permeable membrane in counterflow. The semi-permeable membrane selectively admits water but rejects dissolved salts. The difference in osmotic pressure on either side of the membrane causes a flow of pure water from the feed stream into the pre-pressurized draw, thereby increasing the volumetric flow rate of the pressurized draw stream, which can be depressurized in a turbine to produce electrical work. Apparatus and methods for pressure-retarded osmosis are described in U.S. Pat. No. 3,906,250 (S. Loeb, Univ. Ben Gurion). An apparatus referred to as a salinity gradient power unit (SGPU) is described in U.S. Pat. No. 8,695,343 B2 (N. Moe, General Electric Co.).

In brine-recirculation HDH (HDH-BR), which is also known as a "closed-water" cycle, a portion of the concentrated brine from the humidifier is recirculated, cooled, and mixed with the feed. This technique, which can be important in brine concentration applications, is used to achieve higher recovery ratios, which are calculated as $RR=\dot{m}_p/\dot{m}_f$, than are obtainable in a single-pass, or open-water HDH arrangement. As the brine and feed streams are mixed, however, exergy is destroyed.

SUMMARY

Apparatus and methods for hybridized humidification-dehumidification, pressure-retarded osmosis are described herein, where various embodiments of the apparatus and methods may include some or all of the elements, features and steps described below.

A hybrid of humidification-dehumidification (HDH) desalination and pressure-retarded osmosis can be used to produce clean water and power in brine concentration applications. In brine concentration applications, HDH is generally configured in a manner that recirculates a portion of the brine produced in a single evaporative pass so that greater recoveries of product (fresh) water can be achieved from the feed stream. When a portion of this high-salinity brine (e.g., with 26% NaCl and/or other salt—i.e., 260 grams of salt per kilogram of solution) is mixed with incoming feed, large irreversibilities are generated. The exergy destroyed in this mixing process can be instead recovered in a pressure-retarded osmosis system, producing electrical power, which could be used to drive auxiliary equipment and eliminate the need for onsite power generation in off-grid areas.

A method for hybridized humidification-dehumidification and pressure-retarded osmosis includes: directing a flow of a carrier gas through a humidifier; directing the flow of the carrier gas from the humidifier through a dehumidifier; directing a flow of a combined feed liquid through the humidifier, where water vaporizes from the combined feed liquid into the carrier gas; directing the flow of the combined feed liquid from the humidifier through the dehumidifier, wherein the combined feed liquid cools the carrier gas to condense water from the carrier gas; extracting a concentrated brine stream from the humidifier, wherein the concentrated brine stream is a remnant of the combined feed liquid after water is vaporized from the combined feed liquid in the humidifier; directing at least a portion of the concentrated brine stream through an osmosis chamber of a pressure-retarded osmosis unit on a first side of a membrane; directing an initial feed solution through the osmosis chamber on a second side of the membrane in counterflow to the concentrated brine stream, wherein water from the initial feed solution flows through the membrane into the concentrated brine stream to dilute and increase the volumetric flow of the brine stream; extracting the diluted brine stream from the pressure-retarded osmosis unit and depressurizing the diluted brine stream to produce power; and extracting the initial feed solution from the pressure-retarded osmosis unit and combining the depressurized, diluted brine stream with the initial feed solution to form the combined feed liquid.

The combined feed liquid and the carrier gas can be circulated with pumps, and the pumps can be powered with the power produced by depressurizing the diluted brine stream. In additional embodiments, a light, a computer for controlling the operation of the humidifier and dehumidifier, and pumps that circulate the feed liquid, brine and the carrier gas can be powered with the power produced by depressurizing the brine stream.

In particular embodiments, the initial feed solution comprises at least 1% or at least 10% by mass dissolved solute. For example, the initial feed solution can include flowback or produced water from production of oil and/or gas or can include sea water.

In additional embodiments, the combined feed liquid is heated as it is passed from the dehumidifier to the humidifier.

In yet more embodiments, heat from the combined feed liquid is extracted before the feed liquid passes through the dehumidifier.

Further still, the concentrated brine stream can be pre-pressurized by a pump before entering the osmosis chamber.

A hybrid humidification-dehumidification and pressure-retarded osmosis system includes: a humidifier; a dehumidifier; gas-flow conduits configured to circulate a carrier gas through the humidifier and through the dehumidifier; liquid-flow conduits configured to circulate a combined feed liquid through the dehumidifier and through the humidifier; and a pressure-retarded osmosis unit. The pressure-retarded osmosis unit includes: an osmosis chamber; a semi-permeable membrane, wherein the pressure-retarded osmosis unit is coupled with one of the liquid-flow conduits to feed concentrated brine stream from the humidifier through the osmosis chamber on a first side of the semi-permeable membrane and is coupled with an initial-feed-solution source to pass initial feed solution from the initial-feed-solution source through the osmosis chamber on a second side of the semi-permeable membrane; and a turbine and generator coupled with an outlet from the osmosis chamber on the second side of the semi-permeable membrane. The system further includes a junction configured to combine flow of the brine flow from the turbine with feed liquid from an outlet from the first side of the semi-permeable membrane, wherein one of the liquid-flow conduits provides fluid communication between the junction and the humidifier.

In particular embodiments, the system further includes pumps positioned and configured to pump fluids through the gas-flow conduits and through the liquid-flow conduits, wherein the pumps are configured to receive power from the turbine and generator.

Figure 1:
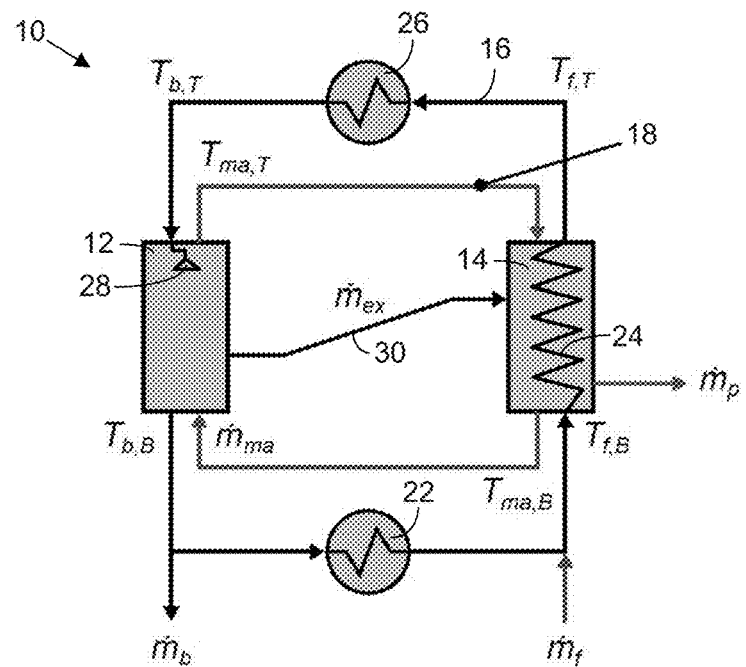
FIG. 1 is a schematic illustration of a traditional humidification-dehumidification (HDH) system that uses a carrier gas to evaporate water from a saline feed stream.

In the accompanying drawings, like reference characters refer to the same or similar parts throughout the different views; and apostrophes are used to differentiate multiple instances of the same or similar items sharing the same reference numeral. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Figure 2:
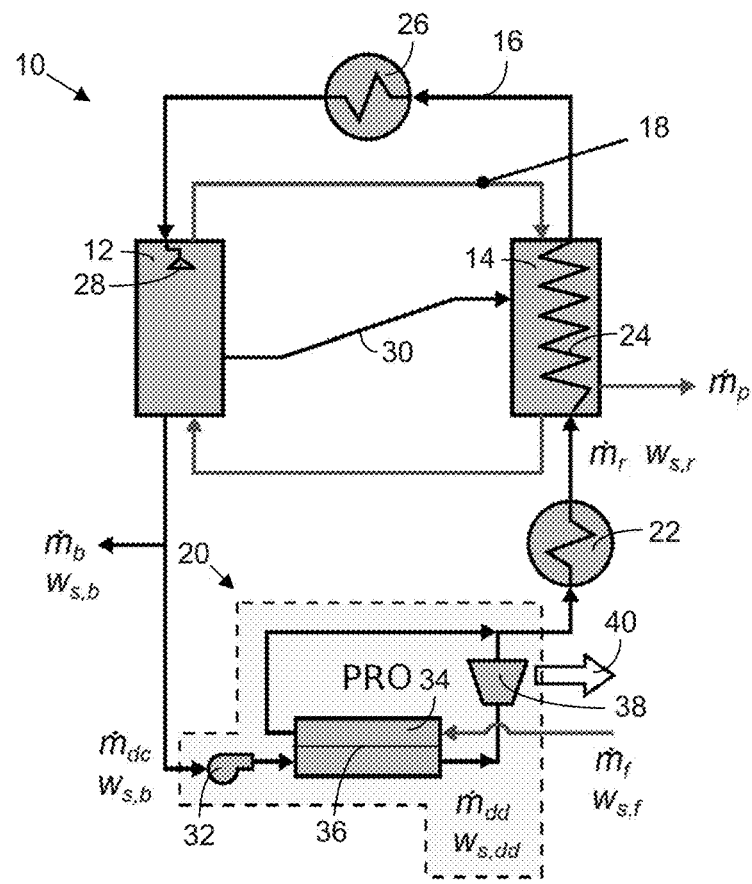
FIG. 2 is a schematic illustration of a hybrid humidification-dehumidification and pressure-retarded osmosis (HDH-PRO hybrid) system.

The humidification-dehumidification, pressure-retarded osmosis (HDH-PRO) hybrid system shown schematically in FIG. 2 recovers the irreversibility lost in the mixing process and generates a useful electrical work output 40. The top half of the apparatus in FIG. 2 is the HDH system 10, which includes a carrier-gas loop 18 (shown as the inner loop) for flow of a carrier gas (e.g., air) through the humidifier 12, where it picks up water vapor from a combined feed liquid, and through the condenser (dehumidifier) 14, where the water vapor is condensed to produce pure water, before being directed back through the humidifier 12 again. In other embodiments, the carrier-gas loop 18 can be open-ended; in an open-air system, air from the surroundings can be drawn into the humidifier 12 and exhausted from the bottom of the dehumidifier 14 without being recirculated. The humidifier 12 and dehumidifier 14 are substantially thermally isolated, except for heat transfer via the circulating carrier gas and combined feed liquid (e.g., heat is not transferred between the humidifier 12 and the dehumidifier 14 via a shared heat-transfer wall in this HDH system 10).

Meanwhile, an initial feed solution (e.g., with more than 1% by mass dissolved solute—for example, sea water with 3-4% by mass dissolved salt) is mixed with recirculated brine after the streams are passed through a pressure-retarded osmosis (PRO) unit 20 and combined to produce a combined feed liquid stream ($\dot{m}_r$). In other embodiments the initial feed solution can be flowback or produced water from production of oil and/or gas. In a particular example, the initial feed solution can be produced water with 10-25% dissolved solute by mass.

Next, heat is removed, e.g., by a heat exchanger 22, from the combined feed liquid; and the combined feed liquid is then passed through a conduit 24 in the dehumidifier 14 to cool the humidified carrier gas therein and thereby produce an output flow of fresh water condensate ($\dot{m}_p$), wherein the fresh water concentrate can have no more than 1,000 mg per liter of solute dissolved therein. After exiting the dehumidifier 14 (in the outer loop 16) and supplied with heat (e.g., from a heat exchanger or heater 26), the combined feed liquid is then directed into the humidifier 12, where it can be sprayed from a sprayer 28 to produce fine droplets from which water can be evaporated into the counter-current carrier gas. Alternatively, the humidifier 12 can take another form, such as a bubble-column humidifier, as described in US 2014/0367871 A1. As shown, one or more intermediate exchange conduits 30 can transfer the feed liquid/brine and/or carrier gas between intermediate stages of the humidifier 12 and dehumidifier 14.

A concentrated brine stream ($\dot{m}_b$) is discharged from the bottom of the humidifier 12. A first part of the concentrated brine stream is removed from the system; and a second part of the concentrated brine stream, referred to as the recirculated brine stream ($\dot{m}_{dc}$) with a mass fraction of salts (salinity), w, is pre-pressurized by a pump 32 and then fed through the osmosis chamber of a pressure-retarded-osmosis (PRO) unit 20, where it serves as the draw and where it is diluted and pressurized by the initial feed solution stream ($\dot{m}_f$). The osmosis chamber 34 includes a semi-permeable membrane 36 that separates the draw (recirculated brine) stream from the initial feed solution stream and through which water passes from the initial feed solution stream to the draw stream. The semi-permeable membrane 36 can be formed of a polyamide and can be thinner than (due to an absence of high pressures), though otherwise similar to, membranes used in reverse-osmosis (RO) systems. The diluted draw stream ($\dot{m}_{dd}$) is then depressurized in a turbine 38 (coupled with an electrical generator) that produces power. The depressurized, diluted draw stream is then mixed with the concentrated feed liquid to form a combined feed liquid and fed to the humidification-dehumidification system 10. In an ideal case, both the concentrated feed liquid and the diluted draw are at the same salinity.

Pressure-retarded osmosis has been investigated in hybrid configurations with seawater desalination systems but found to be of limited use [see L. D. Banchik and J. H. Lienhard V, "Thermodynamic analysis of a reverse osmosis desalination system using forward osmosis for energy recovery," ASME 2012 International Mechanical Engineering Congress and Exposition, American Society of Mechanical Engineers, (2012) and W. Akram, M. H. Sharqawy, and J. H. Lienhard V, "Energy utilization of brine from an MSF desalination plant by pressure retarded osmosis," The International Desalination Association World Congress on Desalination and Water Reuse 2013, Tianjin, China (2013)]. These approaches did not produce a significant amount of power, even at the physical (thermodynamic) limit.

The approach described herein, however, can produce a meaningful amount of power and substantially more power (particularly with highly saline solutions) than the above approaches. First, the amount of fresh water produced per unit feed (the recovery ratio) can be relatively low in single-pass HDH (compared with other systems), so large masses of concentrate are recirculated (in closed water HDH, or HDH-BR) to concentrate the produced water by a meaningful amount. Concentrating the produced water feed by a significant amount is critical in brine concentration applications, where the goal is reducing the volume of waste, rather than producing fresh water (as in, e.g., drinking water desalination). PRO operates more effectively in this context—when large masses of concentrate are mixed with relatively small amounts of a more diluted stream. Second, large differences in salt concentration between the two streams fed through the PRO chamber produce more power when mixed in PRO; in particular, when a highly saline feed solution (e.g., highly saline produced water with a dissolved salt concentration of 10-25% by weight) is used in a HDH-PRO system, as described herein, the PRO unit can produce a significant amount of power, as the inventors have recognized that the same salinity difference at a higher absolute salt concentration produces more power because of nonlinearities in the osmotic pressure vs. salinity curve.

Generally, pressure-retarded osmosis is most effective (i.e., it produces the most power per unit of feed) when the draw salinity is high (e.g., from 8% to 26%) both relative to that of the feed liquid (particularly with low-salinity, freshwater feed liquid) and in absolute terms, where the slope of the osmotic pressure versus salinity curve is higher. Such high salinity can be achieved, e.g., in a zero- or reduced-liquid discharge application, such as in an ecologically sensitive region where waste liquid is not readily discharged back into the environment. Furthermore, with pressure-retarded osmosis before the heat rejection step, the osmotic pressure of the recirculated brine stream will be higher than at room temperature, which increases the possible power output and can reduce the size of the heat exchanger required in the heat rejection step. In brine concentration by humidification-dehumidification, the absolute value of salinity is high; the difference between the salinity of the recirculated brine stream and the salinity of the initial feed solution is high; and the recirculated brine stream is warm. This combination means that the pressure-retarded osmosis system is operating over one of its most effective domains.

Process Analysis

Figure 3:
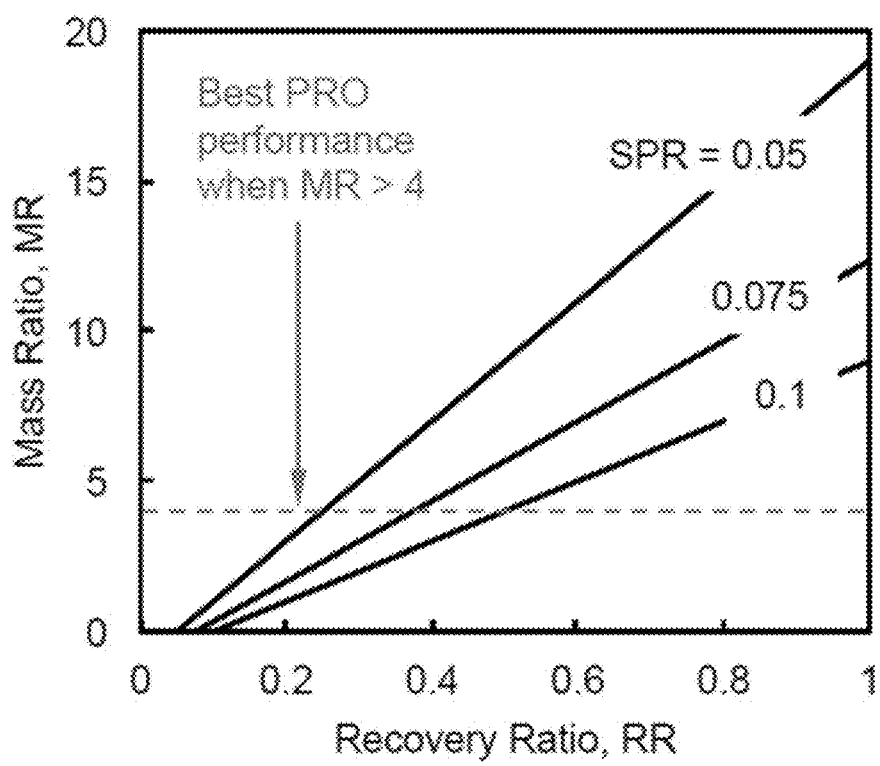
FIG. 3 is a plot of mass ratio (MR) versus recovery ratio (RR) for HDH-PRO.

Pressure-retarded osmosis produces the greatest amount of work 40 when mass ratios (MR=$\dot{m}_{dc}/\dot{m}_f$) are high ($\geq 4$). The value of the mass ratio, MR, is dictated by the recovery ratio in a single pass of the humidification-dehumidification system 10 (SPR=$\overline{m}_p/\overline{m}_r$) and by the recovery ratio of the entire system, RR. From a salt balance on the shaded pressure-retarded osmosis control volume in FIG. 2, the mass ratio, MR, can be expressed as follows:

$$MR = \frac{RR - SPR}{SPR}, \quad (1)$$

which is plotted in FIG. 3 for SPR=0.05, 0.075, and 0.1. Thus, we see that the pressure-retarded osmosis system 20 performs best (with MR>4) when the humidification-dehumidification system 10 is operating above 25-50% recovery, depending on the single-pass mass ratio. These values are typical recoveries for brine concentration, indicating that the hybridization is well conceived.

The maximum power is obtained from a pressure-retarded osmosis system 20 when the system size is large and the mass ratio, MR, is high. From L. D. Banchik, M. H. Sharqawy, and J. H. Lienhard V, "Limits of power production due to finite membrane area in pressure retarded osmosis," 468 Journal of Membrane Science 81-89 (2014), the maximum work (W) per unit feed ($\dot{m}_f$) can be expressed as follows:

$$\frac{\dot{W}}{\dot{m}_f} = \frac{\eta \Delta \pi_{max}}{\rho_{dd}} (\theta_d - 2\sqrt{\theta_d \theta_f} + \theta_f), \quad (2)$$

where $$\pi_{max} = \pi_{dc} - \pi_f, \quad (3)$$

$$\theta_d = \frac{\pi_{dc}}{\Delta \pi_{max}}, \quad (4)$$

and $$\theta_f = \frac{\pi_f}{\Delta \pi_{max}}. \quad (5)$$

In the above equations, $\pi$ denotes osmotic pressure; $\rho_{dd}$ is the density of the dilute draw; and $\eta$ is the combined efficiency of the turbine and generator.

Figure 4:
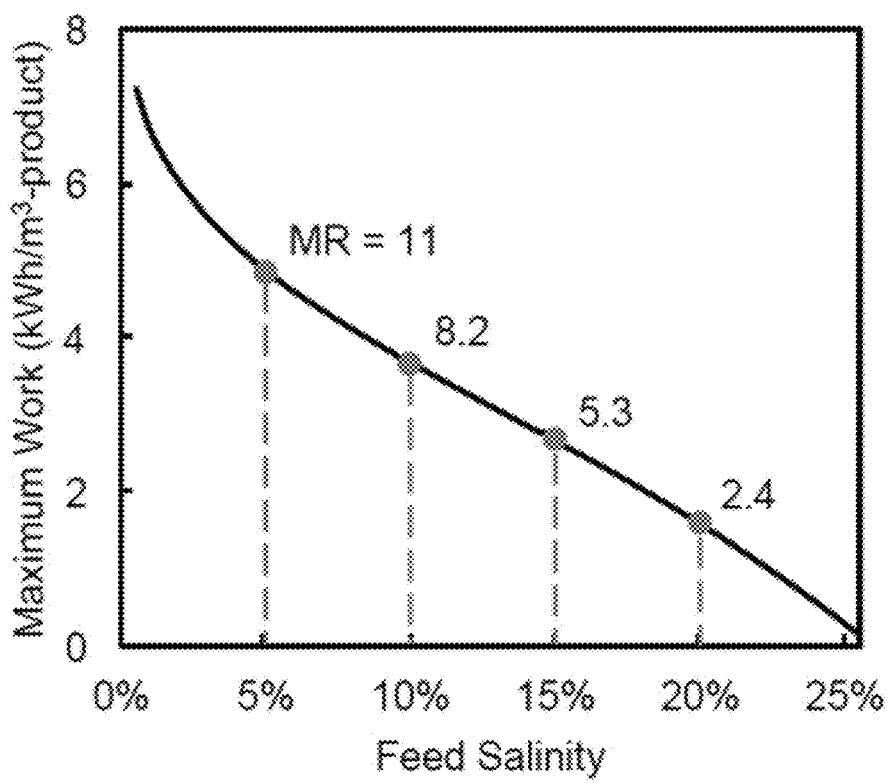
FIG. 4 is a plot of maximum work versus feed salinity for HDH-PRO.

As work is usually normalized per unit product in a desalination system and to benchmark this power production against work requirements for desalination systems, $\dot{W}/\dot{m}_p = \dot{W}/\dot{m}_f$ (1/RR) is plotted in FIG. 4. For a typical brine-concentration application, such as shale-gas-produced water with a feed salinity of 15%, and a 25° C. brine stream, a maximum energy of 2.66 kWh/m³ can be produced with the pressure-retarded osmosis hybridization described herein (this value of energy increases by about 8% per 10° C. increase in brine-stream temperature). For a typical, small-scale installation of 1,000 m³ of product water per day, this equates to about 110 kW, or about the output of a large residential diesel generator. The total electrical consumption of humidification-dehumidification is reported to be about 0.45 kWh/m³ [see G. P. Narayan, M. St. John, S. M. Zubair, and J. H. Lienhard V, "Thermal design of the humidification-dehumidification desalination system: an experimental investigation," 58 International Journal of Heat and Mass Transfer 740-748 (2013)], indicating that even capturing 17% of the maximum power from the pressure-retarded osmosis unit 20 would be sufficient to power the humidification-dehumidification auxiliaries and make the system completely grid independent.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by 1/100th, 1/50th, 1/20th, 1/10th, 115th, 1/3rd, ½, 2/3rd, ¾th, 415th, 9/10th, 19/20th, 49/50th, 99/100th etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for hybridized humidification-dehumidification and pressure-retarded osmosis, comprising:
   directing a flow of a carrier gas through a humidifier;
   directing the flow of the carrier gas from the humidifier through a dehumidifier;
   directing a flow of a combined feed liquid through the humidifier, where water vaporizes from the combined feed liquid into the carrier gas;
   directing the flow of the combined feed liquid from the humidifier through the dehumidifier, wherein the combined feed liquid cools the carrier gas to condense water from the carrier gas;
   extracting a concentrated brine stream from the humidifier, wherein the concentrated brine stream is a remnant of the combined feed liquid after water is vaporized from the combined feed liquid in the humidifier;
   directing at least a portion of the concentrated brine stream through an osmosis chamber of a pressure-retarded osmosis unit on a first side of a membrane;
   directing an initial feed solution through the osmosis chamber on a second side of the membrane in counterflow to the concentrated brine stream, wherein water from the initial feed solution flows through the membrane into the concentrated brine stream to dilute and increase the volumetric flow rate of the brine stream and to concentrate the initial feed solution;
   extracting the diluted brine stream from the osmosis chamber and depressurizing the diluted brine stream to produce power; and
   extracting the concentrated initial feed solution from the osmosis chamber and combining the depressurized, diluted brine stream with the concentrated initial feed solution after both are extracted from the osmosis chamber to form the combined feed liquid.

2. The method of claim 1, wherein the combined feed liquid and the carrier gas are circulated with pumps, the method further comprising powering the pumps with the power produced by depressurizing the diluted brine stream.

3. The method of claim 1, further comprising powering at least one of a light, a computer for controlling operation of the humidifier and dehumidifier, and pumps that circulate the combined feed liquid, brine and the carrier gas with power produced by depressurizing the diluted brine stream.

4. The method of claim 1, wherein the initial feed solution comprises at least 1% by mass dissolved solute.

5. The method of claim 1, wherein the initial feed solution comprises at least 10% by mass dissolved solute.

6. The method of claim 1, wherein the initial feed solution comprises flowback or produced water from production of at least one of oil and gas.

7. The method of claim 1, further comprising heating the combined feed liquid as the combined feed liquid is passed from the dehumidifier to the humidifier.

8. The method of claim 1, further comprising extracting heat from the combined feed liquid before the combined feed liquid passes through the dehumidifier.

9. The method of claim 1, further comprising increasing the pressure of the concentrated brine stream before the concentrated brine stream is directed into the osmosis chamber.

\* \* \* \* \*